May 26, 1970  B. J. VACHON  3,513,555

THICKNESS GAUGING APPARATUS

Filed March 30, 1967  3 Sheets-Sheet 1

Bradstreet J. Vachon
INVENTOR.
BY John E. Toupal
ATTORNEY.

May 26, 1970  B. J. VACHON  3,513,555
THICKNESS GAUGING APPARATUS
Filed March 30, 1967  3 Sheets-Sheet 3

Bradstreet J. Vachon
INVENTOR.
BY John E. Toupal
ATTORNEY.

United States Patent Office 3,513,555
Patented May 26, 1970

3,513,555
THICKNESS GAUGING APPARATUS
Bradstreet J. Vachon, 32 Prior Drive,
Framingham, Mass. 01701
Filed Mar. 30, 1967, Ser. No. 626,999
Int. Cl. G01b 3/22
U.S. Cl. 33—172                                 26 Claims

ABSTRACT OF THE DISCLOSURE

A thickness gauge with a sensing head maintained a given distance above a base supported sheet material by an air cushion formed by air discharged from the sensing head. A rigid support mechanism fixes the lateral position of the sensing head above the sheet while a flexible coupling allows movement of the head in directions normal to the sheet material. A readout device responsive to movement of the sensing head provides an indication of sheet material thickness.

---

This invention relates generally to an apparatus for measuring material thicknesses and especially to apparatus suitable for making continuous thickness measurements of moving sheet or web materials.

Many varieties of gauges are available for measuring the thickness of sheet materials. The existing types include mechanical, pneumatic, electrical, electronic, etc. and vary in complexity from the simple micrometer caliper gauge to the very sophisticated beta absorption gauge. These gauges can be classified generally as contacting types having a measuring element in contact with the sheet being measured and non-contacting types which maintain a separation between the measuring element and the sheet.

Contacting type gauges are unsatisfactory for continuous measurement of moving sheets because of the problems resulting from the required contact between the measuring element and the moving sheet. These devices include among others the dial indicator gauge which measures the position of a sheet contacting spindle relative to a gauge base and indicates the measurement with a pointer needle on a graduated, circular dial; the magnetic comparator gauge wherein the contacting head is attached to the movable core of a differential transformer the variable inductance of which provides an indication of material thickness; and the magnetic gauge wherein the sheet is passed between a sheet contacting electromagnet and a magnetic support which together with the sheet form a magnetic path so that the measured inductance of the electromagnetic coil is dependent upon sheet thickness.

A common noncontacting type is the pneumatic gauge having an air nozzle positioned closely adjacent the sheet material so that the thickness thereof determines the rate of air flow through the nozzle and, accordingly, the air pressure behind the nozzle. The measured air pressure is an indication of material thickness. A principal drawback of the pneumatic gauge as well as of most contacting gauges results from the fact that measurement is based on a fixed reference position of the material supporting base member. Thus, for those frequent applications wherein a rotating calendar roll is utilized as the sheet positioning mechanism, radial imperfections in the roll's surface introduce measuring errors. Also, because of the requirement for extremely small air discharge orifices, the pneumatic gauge provides a particular measurement of a rather minute surface area rather than a usually more desirable average measurement of a larger surface area.

Another noncontacting type is the capacity gauge in which the plates of a condenser are positioned on opposite sides of the sheet to be measured. For a material having a dialectric constant different from that of air, a measurement of the condenser's electrostatic capacity provides an indication of material thickness. Capacity gauges, in addition to offering utility only for materials with suitable dielectric properties, are extremely sensitive to variations in the moisture content of the measured materials since the dielectric constant of water can be about ten times higher than the material being measured.

Also known are several types of radiation gauges including radiation absorption gauges, X-ray gauges, beta gauges, gamma gauges, radiation back scattering gauges, etc. In all of these the material sheet in some manner reduces the intensity of a source of radiation in dependence upon the sheet thickness. Thus, a radiation detector measuring intensity provides an indication of that thickness. Typically the various radiation gauges entail radiation hazards, are quite expensive and require frequent standardization or calibration which is highly undesirable for applications involving a continuously moving sheet.

U.S. Pat. No. 2,982,124 illustrates another noncontacting gauge which is basically a combination of a dial indicator gauge and a pneumatic gauge. In this device a hydraulic piston and cylinder assembly responsive to the air discharge rate through a movably mounted orifice is utilized to maintain the orifice a predetermined distance above a sheet being measured. The vertical position of the orifice head relative to the gauge base is then utilized to control a dial indicator gauge. The measuring sensitivity exhibited by this instrument has been generally unsatisfactory because of various mechanical and pneumatic problems including several of those noted above.

The object of this invention is to provide an improved, relatively low cost gauge apparatus which can continuously and accurately measure the thickness of a moving material sheet.

A primary feature of this invention is the provision of a sheet material thickness gauging instrument having a material positioning base which supports one surface of the material sheet and a sensing head movably mounted adjacent the opposite surface of the material sheet and adapted to be supported therefrom by an air cushion produced by air discharged against the surface of the sheet from a vent in the sensing head. With a substantially constant pressure source of air, the air cushion maintains a constant predetermined spacing between the sheet and the sensing head and its position relative to the fixed base is directly dependent upon the sheet material thickness. Since no contact exists between the sensing head and the material, this arrangement is particularly well suited for continuous measurement of moving sheets.

Another feature of this invention is the provision of a gauge instrument of the above featured type wherein the air discharge vent includes an open-bottomed housing positioned adjacent the sheet material and defining a chamber with a substantial cross-sectional area parallel to the sheet. The chamber distributes the air over a relatively large area of the sheet before its ultimate discharge through the peripheral gap between the housing and the material sheet thereby establishing an air cushion of substantially uniform pressure distribution and greatly improving the overall stability of the sensing head.

Another feature of this invention is the provision of a gauge instrument of the above featured type wherein the gauge base is formed of magnetic material and completes, with the material sheet and the predetermined sensing head spacing, the magnetic path for an electromagnetic coil mounted in the sensing head. Variation in the sheet thickness alters the length of the reluctance gap formed by the sheet and the predetermined head spacing thereby causing a proportional variation in the inductance of the electromagnetic coil. Thus, an electrical circuit which measures changes in the coil's inductance will provide an indication of sheet material thickness. This arrangement is particularly useful with devices having a rotating roll as a sheet positioning mechanism since radial nonuniformities in the roll will not introduce measuring inaccuracies.

Another feature of this invention is the provision of a gauge instrument of the above featured type wherein the sensing head is supported by a fulcrum mounted lever mechanism having adjustable balancing weights. This support mechanism permits adjustable balancing of the sensing head to establish a desired lifting force required of the air cushion.

Another feature of this invention is the provision of a gauge instrument of the above featured type wherein the gauge base is a rotatable cylinder and the side walls of the pressure confining housing posses arcuately shaped terminal portions adjacent to and confroming with the surface of the cylinder. The arcuately shaped walls portions create a uniform peripheral gap between the sensing head and sheet material's surface thereby promoting uniform air pressure distribution and overall instrument stability.

Another feature of this invention is the provision of a gauge instrument of the above featured type wherein the sensing head is adapted for transverse movement along a path parallel to the surface of the sheet material thereby permitting more representative measurements of moving sheets having substantial width.

Another feature of this invention is the provision of a gauge instrument of the above featured type wherein the electrical readout circuitry includes a transmitter which provides an output signal dependent upon the value of the electromagnetic coil's inductance, a variable voltage supply which provides an adjustable reference signal, a primary meter which indicates the value of the output signal and an auxiliary meter which indicates the value of the difference between the output and reference signals. With this arrangement, one can observe on the primary meter an indication of absolute sheet material thickness and can observe on the auxiliary meter an indication of thickness deviation from a predetermined norm represented by the reference signal.

These and other objects and features of the present invention will become more apparent upon a perusal of the following specification taken in conjunction with the accompanying drawings wherein.

Figure 1:
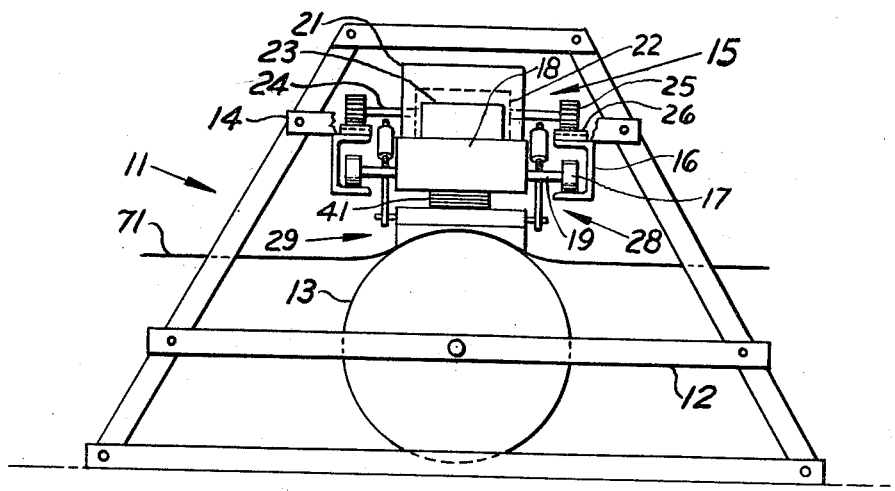
FIG. 1 is a schematic elevational view of a preferred embodiment of the invention.
Figure 2:
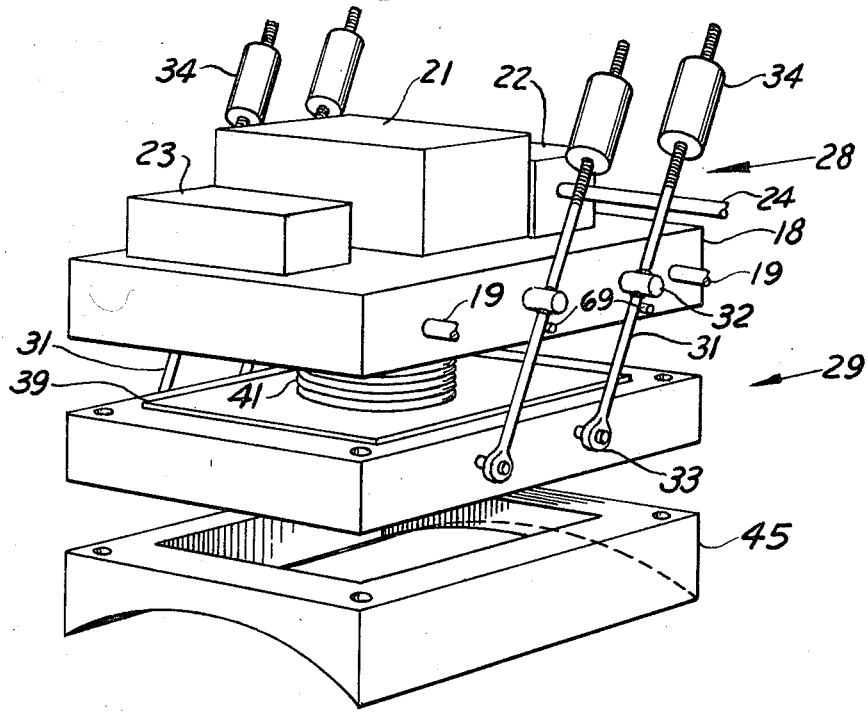
FIG. 2 is a schematic, perspective view showing in greater detail a portion of the gauge embodiment of FIG. 1.

Referring now to FIG. 1, there is shown the base frame 11 having the spaced, horizontally aligned lower cross bars 12 which rotatably support the cylindrical idler roll 13 and the upper cross bars 14 which support the gauge assembly 15. Rigidly between the upper cross bars 14 is a rigid support mechanism 28 including spaced apart channels 16 which carry the rollers 17 attached by shafts 19 to the mounting plate 18. As shown more clearly in FIG. 2, the blower 21 is mounted on the plate 18 between the reversible motor 22 and the transmitter unit 23. Extending from opposite sides of the motor 22 are the drive shafts 24 having pinion gear terminals 25 which engage the rack gears 26 secured to the channels 16.

The rigid support mechanism 28 is coupled to the sensing head 29 by two pairs of lever arms 31 attached on opposite sides of the mounting plate 18. Each lever arm 31 is connected to the mounting plate 18 by a fulcrum pivot 32 and has one end 33 pivotally attached to the sensing head 29 so as to allow vertical movement thereof. Opposite ends of the lever arms 31 are engaged by longitudinally adjustable balancing weights 34.

Figure 3:
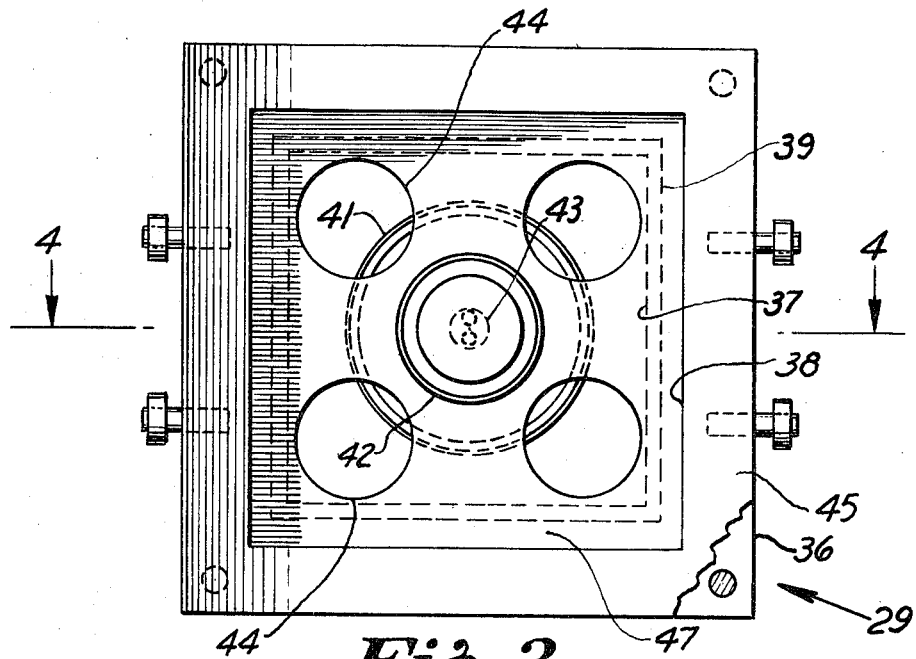
FIG. 3 is a bottom view of the sensing head shown in FIG. 2.
Figure 4:
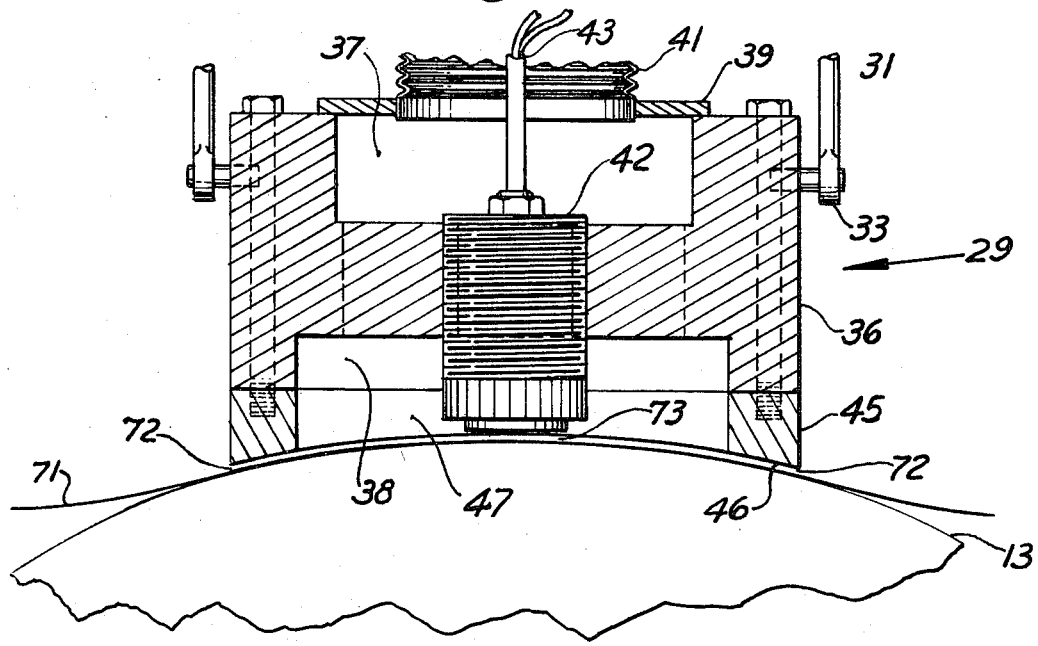
FIG. 4 is a cross-section of the sensing head taken along lines 4—4 of FIG. 3.

As shown more clearly in FIGS. 3 and 4, the sensing head 29 comprises the rectangular body 36 having an upper rectangular recess 37 and a lower rectangular recess 38. A central aperture in the cover plate 39 receives, in an air tight manner, the flexible hose 41 which provides air communication between the blower 21 and the upper recess 37. Threaded into the central portion of the body 36 is the conventional electromagnetic sensor 42 with the electrical connecting leads 43. The orifices 44 are symmetrically disposed about the sensor 42 and provide air communication between the upper recess 37 and the lower recess 38. Demountably attached to the body 36 is the open bottomed housing 45 having walls with downwardly directed, arcuately shaped terminal portions 46 conforming to the surface of the cylindrical roll 13. The lower recess 38 and the volume enclosed by the housing 45 define a pressure distribution chamber 47 having the substantial cross-sectional area shown in FIG. 3. The flexibility of the hose 31 and the pivot connections 32 and 33 permit two dimensions of relative movement between the sensing head 29 and the support mechanism 28.

Figure 5:
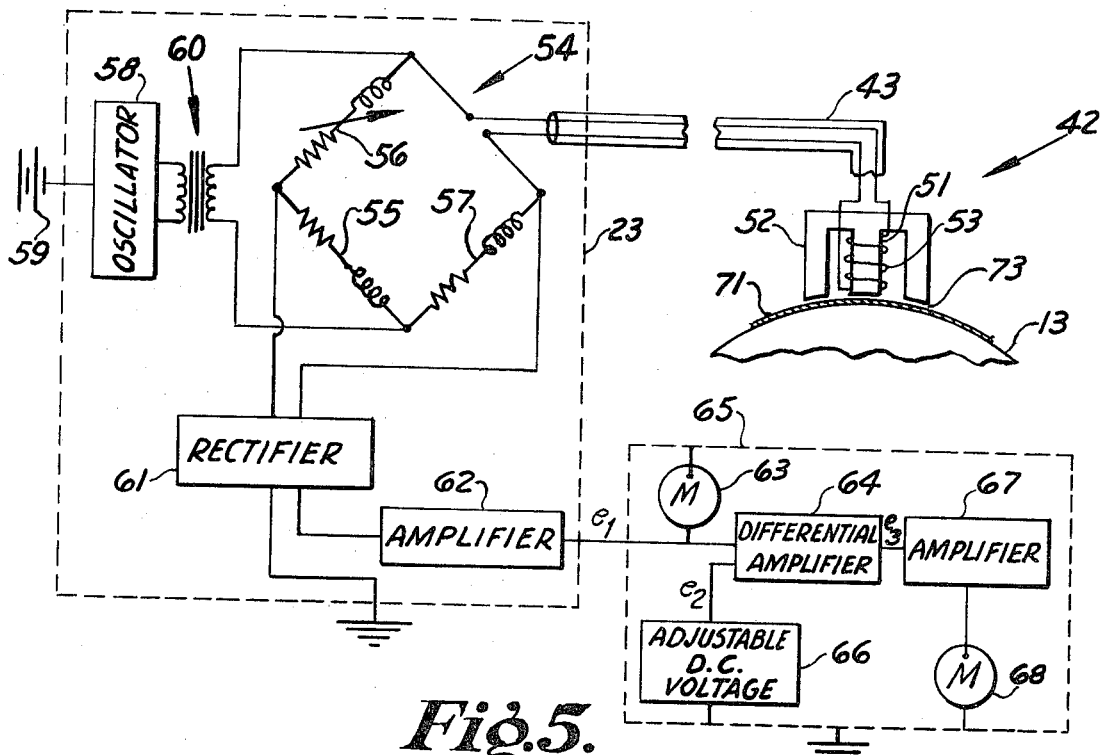
FIG. 5 is a schematic diagram of preferred electrical circuitry for use with the gauge embodiment shown in FIGS. 1–4.

Referring now to FIG. 5, there is shown schematically a preferred readout circuit for use with the gauge assembly 15. As shown, the electromagnet 42 has the center pole piece 51 attached at one end to the surrounding annular pole piece 52. Wound around the pole piece 51 in the gap separating it from the annular pole piece 52 is the coil 53 coupled by the electrical leads 43 to the bridge circuit 54 in the transmitter housing 23. The bridge circuit 54 includes a parallel branch formed by the series connected fixed impedance 55 and the variable bridge balancing impedance 56 and a parallel branch formed by the series connected fixed impedance 57 and the coil 51. Also mounted in the transmitter housing 23 is the oscillator 58 connected to the remote power source 59 and having an output coupled across the bridge circuit 54 by the transformer 60. Connected across the fixed impedances 55 and 57 is the rectifier 61 which rectifies the AC output of the bridge circuit 54 and feeds the resultant DC signal into the amplifier 62. The output voltage $e_1$ from the amplifier 62 is transmitted to the direct current meter 63 and to the differential amplifier 64 both located in a remote console 65 (not shown in FIG. 1 and FIG. 2). Also mounted within the console unit 65 is the adjustable DC voltage source 66 which feeds a constant voltage reference signal $e_2$ into the differential amplifier 64. The difference between the output signal $e_1$ and the reference signal $e_2$ is a difference signal $e_3$ fed by the differential amplifier 64 into the amplifier 67 before measurement by the DC meter 68.

For operation of the invention, a material sheet 71 is passed between the cylindrical roll 13 and the sensing head 29. The lateral position of the sensing head 29 above the roll base 13 and material sheet 71 is fixed by the rigid support mechanism 28 while free movement substantially normal thereto is allowed by the flexible coupling provided by the lever arms 31. However, the sensing head 29 is maintained a minimum distance above the roll by the restraining lever stops 69 shown in FIG. 2. Referring now to FIG. 3 and FIG. 4, energization of the blower 21 produces air flow through the hose 41 and creates an air pressure the upper recess 37. The blower 21 is conventional and can be, for example, of the type commonly used in commercial vacuum cleaners. The air forced through the orifices 44 is confined by the pressure distribution housing 45 over a substantial area of the cylindrical roll 13 thereby forming an air cushion which exerts a lifting force on the sensing head 29. With relatively constant pressure air provided by the blower 21, this air cushion lifts the sensing head 29 a predetermined distance above the material sheet 71 establishing a peripheral gap 72 between the material sheet 71 and the terminal portions 46 of the housing 45. By substantially balancing the sensing head 29 with the adjustable weights 34, the required lifting force is reduced to a minimum. The predetermined spacing 72 between the sensing head 29 and the material sheet 71 also establishes predetermined air gaps 73 between the sheet 71 and the pole pieces 52, 51 in the electromagnet 42 (FIG. 5). These air gaps 73, the material sheet 71, and the cylindrical roll 13 which is formed of a magnetic material complete the magnetic path for the field generated by the coil 53. Since the air gaps 73 remain constant, changes in material sheet thickness cause appreciable variations in the reluctance of the magnetic circuit and, accordingly, in the inductance of the coil 53. The variation in coil inductance is proportional to the change in material sheet thickness. Thus, with the bridge circuit initially balanced for zero output voltage at zero sheet thickness, the output voltage $e_1$ is proportional to sheet thickness and, after proper calibration, the meter 63 provides a direct indication of sheet thickness.

Additional information relating to sheet thickness is provided by the meter 68. By adjusting the voltage source 66 to furnish a reference voltage $e_2$ equal to the value of output voltage $e_1$ at a given sheet thickness, the difference voltage $e_3$ is proportional to sheet thickness deviations from the given norm. Accordingly, the suitably calibrated meter 68 directly indicates caliper deviation while the meter 63 directly indicates absolute caliper. It will be obvious that the voltages $e_1$ and $e_3$ can be utilized to control other readout devices such as pen recorders, computers, control mechanisms, etc.

During movement of the sheet 71 through the gap 72, energization of the motor 22 produces rotation of the pinion gears 25. This drives the entire gauge assembly 15 along the surface of the material sheet 71 on a path parallel to the axis of the cylindrical roll 13. By periodically reversing the direction of motor rotation, the sensing head 29 will continually traverse between the outer edges of the material sheet 71 thereby scanning the entire sheet width.

Thus, the present gauge invention permits during processing sensitive on-line measurements of either the absolute caliper or the caliper deviation of any non-ferrous sheet material. Furthermore, because measurements are made relative to the surface of a supporting roll, accuracy is not affected by sheet flutter, roll diameter or crown finish, environmental vibrations, etc. Other advantages include the possibility of scanning only one side of the sheet, the absence of radiation hazards, the ability to utilize low pressure air thereby inhibiting deformation of the measured sheet, etc.

Figure 6:
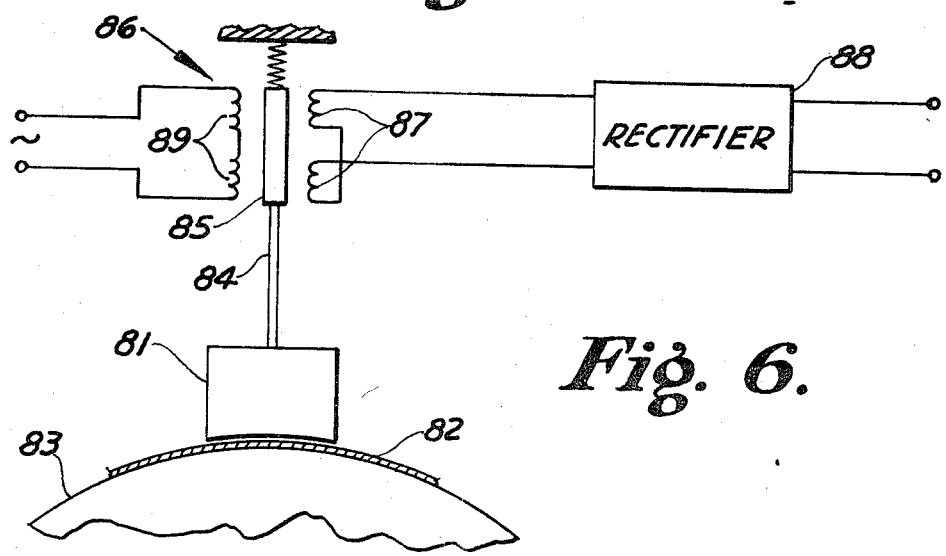
FIG. 6 is a schematic illustration of a modified gauge embodiment of the invention.

FIG. 6 illustrates another invention embodiment having a modified readout arrangement for measuring movement of the sensing head. For reasons of simplicity, the supporting structure for the sensing head 81, the sheet 82 and the roll 83 is not shown. However, it will be understood that a mounting arrangement similar to that shown in FIG. 1 could be suitably utilized. In this embodiment, the shaft 84 connects the sensing head 81 for movement with the core 85 of a linear variable differential transformer 86. The differentially wound secondary windings 87 of the transformer 86 are connected to the rectifier 88 while the primary windings 89 are energized from a suitable source of alternating current.

In this embodiment, the sensing head 81 also is maintained a predetermined distance above the material sheet 72 by an air cushion. Thus, variations in sheet thickness alter the vertical positions of both the sensing head 81 and the attached magnetic core 85. The resultant inductance changes in the secondary windings 87 produce proportional changes in the magnitude of the output voltage from the rectifier 88. Therefore, the output voltage of the rectifier 88 is proportional to sheet thickness and can be used for the same indicating functions described for output voltage $e_1$ in connection with FIG. 5. Although suitable for many applications, this embodiment is sensitive to radial non-uniformities in the roll 83 which cause measuring inaccuracies since the device is responsive to the absolute vertical position of the sensing head 81 rather than the spacing from the roll 83.

Obviously, many modifications and variations of the present invention are possible in light of the above teachings. For example only, the sensing head can be mounted relative to the sheet in positions other than vertically above, the unit can be utilized to measure the thickness of materials other than moving sheets, fluid substances other than air can be used to create the head supporting cushion, etc.

What is claimed is:
1. A thickness gauging apparatus comprising:
   a gauge base,
   a sheet positioning means comprising a support surface for supporting a material sheet the thickness of which is to be determined,
   a sensing head comprising a pneumatic vent means adapted to discharge fluid against the adjacent surface of a material sheet supported by said support surface and to establish with the discharged fluid a fluid cushion that supports the sensing head a predetermined distance from the material sheet,
   and head support means connected to said gauge base and said sensing head, said head support means comprising rigid support means fixing the lateral position of said sensing head with respect to the material sheet by restraining movement of said sensing head in directions substantially parallel to said support surface, said head support means further comprising vertical coupling means allowing movement of said sensing head in directions substantially normal to said support surface.

2. A thickness gauging apparatus according to claim 1 wherein said support surface is formed of magnetic material, said sensing head comprises an electromagnetic sensor and walls that define an open-bottom housing having an interior chamber communicating with the material sheet through said open bottom, said walls terminating substantially equidistantly from said support surface so as to provide a substantially uniform peripheral gap between said walls and the material sheet, and said interior chamber and said electromagnetic sensor include portions equally spaced from the material sheet.

3. A thickness gauging apparatus according to claim 2 wherein said interior chamber surrounds said electromagnetic sensor.

4. A thickness gauging apparatus according to claim 3 wherein said support surface comprises a rotatable cylinder and said walls have arcuate terminal portions adjacent to and conforming to the surface of said cylinder.

5. A thickness gauging apparatus according to claim 1 wherein said vertical coupling means is adapted to reduce the resistance to movement of said sensing head in said directions substantially normal to said support surface.

6. A thickness gauging apparatus according to claim 5 wherein said vertical coupling means comprises an adjustable biasing means for exerting on said sensing head a balancing force in a direction substantially normal to said support surface.

7. A thickness gauging apparatus according to claim 1 wherein said vent means comprises fluid pressure distribution means including an open-bottomed housing having side walls that define a chamber with a substantial cross-sectional area parallel to the sheet and adapted to confine the fluid cushion over a substantial area of the sheet and to permit discharge of the fluid through a peripheral gap between the sheet and said open-bottomed housing.

8. A thickness gauging apparatus according to claim 7 wherein said fluid pressure distribution means comprises a source of fluid pressure and a plurality of parallel ducts that provide fluid communication between said source of fluid pressure and said open-bottomed housing.

9. A thickness gauging apparatus according to claim 7 including a magnetic inductor with an inductance variably dependent upon the position of said sensing head; and including electrical readout means for measuring changes in said variable inductance.

10. A thickness gauging apparatus according to claim 9 wherein said sheet positioning means comprises a magnetic material portion; and said magnetic inductor comprises an electromagnet extending into said chamber of said sensing head and having an electromagnetic coil and a magnetic path including said magnetic material portion, the material sheet and said peripheral gap; and said electrical means measures inductance changes of said electromagnetic coil.

11. A thickness gauging apparatus according to claim 10 wherein said sheet positioning means comprises a rotatable cylinder and said rigid support means is adapted to fix said sensing head in a lateral position substantially radially symmetric to the rotational axis of said cylinder.

12. A thickness gauging apparatus according to claim 11 wherein said housing side walls have arcuate terminal portions adjacent and conforming to the surface of said cylinder.

13. A thickness gauging apparatus according to claim 12 wherein said rigid support means is adapted for controlled movement along a path substantially parallel to the rotational axis of said cylinder.

14. A thickness gauging apparatus according to claim 13 wherein said readout means comprises transmitter means adapted to provide an output signal dependent upon the value of said inductance, a reference signal means adapted to provide an adjustable reference signal, a primary indicator means responsive to said output signal, and an auxiliary indicator means responsive to the difference between said output and reference signals.

15. A thickness gauging apparatus according to claim 9 wherein said magnetic indicator comprises a variable differential transformer means having a core attached for movement with said sensing head.

16. A thickness gauging apparatus according to claim 13 wherein said vertical coupling means comprises an adjustable biasing means adapted to reduce resistance to movement of said sensing head in said normal direction by exerting on said sensing head a selectable balancing force in a direction substantially perpendicular to the place of the sheet.

17. A thickness gauging apparatus according to claim 16 wherein said adjustable biasing means comprises a fulcrum mounted lever member having a weighted end on one side of said fulcrum and an opposite end connected to said sensing head.

18. A thickness gauging apparatus according to claim 1 wherein said rigid support means is adapted for controlled movement along a path substantially parallel to said support surface.

19. A thickness gauging apparatus according to claim 1 wherein said sheet positioning means comprises a rotatable cylinder and said rigid support means is adapted to fix said sensing head in a lateral position substantially radially symmetric to the rotational axis of said cylinder.

20. A thickness gauging apparatus according to claim 19 wherein said housing side walls have arcuate terminal portions adjacent and conforming to the surface of said cylinder.

21. A thickness gauging apparatus according to claim 19 wherein said rigid support means is adapted for controlled movement along a path substantially parallel to the rotational axis of said cylinder.

22. A thickness gauging apparatus according to claim 9 wherein said readout means comprises transmitter means adapted to provide an output signal dependent upon the value of said inductance, a reference signal means adapted to provide an adjustable reference signal, a primary indicator means responsive to said output signal, and an auxiliary indicator means responsive to the difference between said output and reference signals.

23. A thickness gauging apparatus according to claim 22 wherein said sheet positioning means comprises a magnetic material portion; and said magnetic inductor comprises an electromagnet extending into said chamber of said sensing head and having an electromagnetic coil and a magnetic path including said magnetic material portion, the material sheet and said peripheral gap; and said electrical means measures inductance changes of said electromagnetic coil.

24. A thickness gauging apparatus according to claim 10 wherein said sheet positioning means comprises a rotatable cylinder and said rigid support means is adapted to fix said sensing head in a lateral position substantially radially symmetric to the rotational axis of said cylinder.

25. A thickness gauging apparatus according to claim 24 wherein said housing side walls have arcuate terminal portions adjacent and conforming to the surface of said cylinder.

26. A thickness gauging apparatus according to claim 1 wherein said head support means comprises restraining means adapted to restrict movement of said sensing head so as to maintain in the absence of said fluid cushion a given minimum spacing between said sheet positioning means and said sensing head.

References Cited
UNITED STATES PATENTS

| | | | |
|---|---|---|---|
| 3,322,222 | 5/1967 | Baur | 177—210 |
| 3,190,261 | 6/1965 | Ziffer | 33—147 |
| 2,982,124 | 5/1961 | Knobel | 73—37.7 |
| 2,928,709 | 3/1960 | Baumeister | 179—100.2 |
| 2,927,455 | 3/1960 | Outterson | 73—37.7 |
| 2,833,046 | 5/1958 | Jeglum | 324—34 |
| 2,665,333 | 1/1954 | Dunipace et al. | 324—24 |
| 2,448,106 | 8/1948 | Mannerbrink et al. | 33—199 |
| 1,946,924 | 2/1934 | Allen et al. | 33—147 |

WILLIAM D. MARTIN, JR., Primary Examiner

U.S. Cl. X.R.

33—147; 324—34